3,039,851
RECOVERY OF CARBON BLACK

John S. Kosewicz, Sidney Gill, and Robert W. Cretney, Monroe, La., assignors to Commercial Solvents Corporation, New York, N.Y., a corporation of Maryland
No Drawing. Filed Dec. 19, 1958, Ser. No. 781,463
4 Claims. (Cl. 23—209.4)

Our invention relates to a process for the recovery of carbon black from an aqueous mixture thereof and more particularly it relates to a process for the recovery of waste carbon black from the water used to cool the product from the so-called thermal carbon black process.

U.S. Patent 1,520,115 describes the so-called thermal carbon black process. In this process, air and a combustible gas or combustible liquid hydrocarbon are admitted to a furnace containing a refractory material such as a so-called checker work, whereby the refractory material is heated after which the combustion is halted and hydrocarbon from which the carbon black is to be obtained is admitted to the furnace into contact with the heated refractory material whereby the carbon black is produced. The mixture of resultant gas and carbon black is conducted from the furnace to a spray tower where it is contacted with water to cool the same. While the majority of the carbon black-gas mixture passes through the cooling tower, a substantial portion of the carbon black is entrained in the cooling water and carried from the cooling tower in this fashion. This carbon black has previously been a waste material due to the fact that no efficient method for recovery of a usable product had been developed. Prior methods for recovery of carbon black had been developed but the product recovered from the waste stream was unsuitable for many of the uses to which carbon black is normally put. This is true because the properties of thermal carbon blacks change when the material is mechanically handled too roughly or for too long a period of time. The surface properties also change when the thermal black remains in water too long.

We have now discovered a process for the recovery of waste carbon black from an aqueous mixture of the same whereby the recovered waste carbon black is substantially the same as and possesses substantially the same characteristics as the product obtained by means of the primary recovery step used with the thermal carbon black process.

Our new process is a combination process where we screen the waste mixture of carbon black and water to remove grit. The slurry from the screening operation is then passed to a conditioning tank with a flotation agent and air under pressure such that the slurry is saturated with the air. The flotation agent which we add is one capable of causing the carbon black to migrate to the surface and float on the water. From the conditioning tank, the slurry is passed through a pressure controlling valve to a flotation tank wherein the pressure is released causing formation of a froth consisting essentially of carbon black, water, flotation agent and air on the surface of the water. From the top of the flotation tank, the froth is removed and conducted to a suitable filtration apparatus whereby the carbon black is further dewatered after which the carbon black is continuously dried in a suitable drying apparatus to obtain the dried thermal carbon black material. The characteristics of the thermal carbon black material obtained by the primary recovery step and that obtained by our new process from the waste carbon stream described above, are described in U.S. Patent 1,638,421. The distinctive feature of our new process lies in the fact that the ordinarily wasted carbon recovered thereby is essentially no different in properties and form from the thermal carbon black recovered by means of the primary recovery process described in U.S. Patent 1,520,115.

As indicated above, the first step in our new process consists of a screening step whereby the original waste stream of carbon black is passed through a screen having a mesh size ranging from about 125–325 to remove grit. We prefer to use a mesh size ranging from about 125–250. Generally, the carbon black content of the original waste stream is about 1.5 to 3.0% by weight.

Following screening of the original waste carbon black stream, we pass the carbon black slurry to a conditioning tank. In this step of our process, we continuously add air and flotation agent to the aqueous carbon black slurry in the transfer line between the screening step and the conditioning tank. In the conditioning tank the slurry is saturated with the air and mixed with the flotation agent. Any suitable flotation agents can be employed; however, we prefer to employ a flotation agent such as, for example, kerosene, pine oil, etc. The amount of flotation agent which we add ranges from about 15 to about 35 parts per million. The amount of air which we employ is that sufficient to substantially saturate the water portion of the slurry. Excess, undissolved air is vented from the system. From the conditioning tank, the mixture of carbon black, water, flotation agent, and air is passed through a pressure controlling valve to a flotation tank wherein the pressure is released causing formation of a froth of carbon black, flotation agent and air on the surface of the water. The froth is continuously removed from the flotation tank as a mixture of carbon black, flotation agent, air and water having a carbon black concentration about five times that of the carbon black slurry delivered to the flotation tank.

The mixture of carbon black, flotation agent, air and water removed from the thickening apparatus, which mixture is generally called a froth, is then passed to a suitable filtration apparatus such as a continuous vacuum filter generally described in the Chemical Engineers Handbook by Perry, McGraw-Hill Book Co., Inc., New York, 3d edition (1950), beginning at page 976. A particularly suitable filtration apparatus which we prefer to employ is that known as the Bird Young filter, a description of which can be found on page 983 of the above-identified Chemical Engineers Handbook. The filtration step of our process generally results in about an 85% reduction in the water content of the mixture of water and carbon black delivered to the filter. The carbon black paste removed from the filtration apparatus and containing about 50% water by weight is then delivered to a suitable drying apparatus wherein the remainder of the water is substantially all removed to obtain a substantially dry carbon black product. The drying step of our new process is conducted in any convenient drying apparatus, however, a particularly suitable type of drying apparatus which can be employed is a so-called rotary drier generally described in the above-identified Chemical Engineers Handbook beginning at page 823. Specifically, we prefer to employ a so-called Roto-Louvre continuous rotary drier, a description of which can be found in the above-identified Chemical Engineers Handbook beginning at page 824. We prefer to conduct the drying operation at a temperature such that the outlet air from the drier has a temperature ranging from about 200 to 300° F. If the so-called stainless thermal carbon black is desired, we can obtain it by our process by conducting the drying operation at a temperature of from about 400° F. to about 550° F. The stainless product is described in U.S. Patent 1,947,789.

The following example is offered to illustrate our invention but we do not intend to be limited to the specific procedures, proportions, amounts or material described.

Example I

A waste thermal carbon black slurry containing 0.2 pound of carbon per gallon at a temperature of 170° F. was passed from the primary coolers employed to cool the product from the production furnace and pumped through a 200 mesh wire cloth screen to remove grit to a holding tank positioned below the screen. From the holding tank, the slurry was pumped to a conditioning tank while metering into the slurry 31 parts per million of kerosene and air at a pressure of 30 pounds per square inch sufficient to substantially saturate the slurry, the components becoming intimately mixed in the conditioning tank. The slurry was then pumped to a flotation tank through a pressure controlling valve which maintained a pressure of 30 p.s.i. in the conditioning tank. In the flotation tank the pressure was released and a froth of carbon black, flotation agent, and air formed on the surface of the water. The froth containing 0.816 pound of carbon per gallon was removed and pumped to a rotary vacuum filter from which a filter cake containing one pound of water per pound of carbon was removed. The filter cake was then conveyed to a rotary drier wherein the moisture content was reduced from 50% to 0.05%. The drier air outlet temperature was 250° F.

This application is a continuation-in-part of our U.S. patent application Serial No. 590,806, filed June 12, 1956, now abandoned.

Now having described our invention what we claim is:

1. In a process for the production of carbon black by thermally decomposing fluid hydrocarbons to produce a mixture of hot gases and entrained solid carbon, bringing the mixture into contact with an excess of spraying water to cool it, separating the major portion of the carbon black as a dry carbon black to produce a primary carbon black product and treating the residual water containing from about 1.5 to 3 percent carbon black to produce a secondary carbon black product having substantially the same properties and form as the primary carbon black product, the steps which comprise screening the aqueous mixture of residual water and from 1.5 to 3 percent carbon black through a 125–325 mesh sieve, treating the screened aqueous mixture with air under pressure and from 15 to 35 parts of a flotation agent per million parts of said aqueous mixture, releasing the air pressure and removing the aqueous floating carbon layer that forms, filtering the withdrawn mixture of carbon and water and drying the filter cake to obtain a dry carbon black possessing substantially the same characteristics as the primary carbon black product.

2. The process of claim 1 wherein the mesh size ranges from about 125 to about 250.

3. The process of claim 1 wherein the filter cake is dried at about 400 to about 550° F.

4. The process of claim 1 wherein the filter cake is dried at about 200 to about 300° F.

References Cited in the file of this patent

UNITED STATES PATENTS

| | | |
|---|---|---|
| 2,254,572 | Harlow | Sept. 2, 1941 |
| 2,317,139 | Frantz | Apr. 20, 1943 |
| 2,668,754 | Lichtenfels | Feb. 9, 1954 |
| 2,725,985 | Howard et al. | Dec. 6, 1955 |
| 2,746,564 | Williams | May 22, 1956 |
| 2,757,797 | Eckert et al. | Aug. 7, 1956 |
| 2,894,603 | Vasan | July 14, 1959 |